Walter H. Glazier  Inventor

By John D. Gassett  Attorney

Feb. 5, 1963 W. H. GLAZIER 3,076,379
METHOD AND APPARATUS FOR MAKING VARIABLE
DENSITY SEISMIC DEPTH SECTIONS
Filed May 27, 1959 3 Sheets-Sheet 2

Walter H. Glazier   Inventor

By John D. Gassett   Attorney

Feb. 5, 1963 W. H. GLAZIER 3,076,379
METHOD AND APPARATUS FOR MAKING VARIABLE
DENSITY SEISMIC DEPTH SECTIONS
Filed May 27, 1959 3 Sheets-Sheet 3

Walter H. Glazier    Inventor

By John D. Gassett    Attorney

United States Patent Office 3,076,379
Patented Feb. 5, 1963

3,076,379
METHOD AND APPARATUS FOR MAKING VARIABLE DENSITY SEISMIC DEPTH SECTIONS
Walter H. Glazier, Calgary, Alberta, Canada, assignor to Jersey Production Research Company, a corporation of Delaware
Filed May 27, 1959, Ser. No. 816,264
9 Claims. (Cl. 88—24)

This invention relates to reproducing a print in which the reproduced print is distorted from the print being reproduced. It relates particularly to a system for producing seismic sections in a form easier to interpret. It also relates especially to a differential reduction printer that changes the relationship of horizontal to vertical scale of a seismic section.

Geophysical prospecting procedures using artificially induced seismic disturbances have found wide application in the search for petroleum and other mineral deposits. In all of these methods it is general practice to initiate an explosion or other seismic disturbance at a point near the surface of the earth and to direct seismic waves downward into the earth from that point. The waves continue to travel downward within the earth until they encounter discontinuities in the earth's structure in the form of various substrata formations and the like. The discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. Furthermore, by using accurate timing devices and recording means it is possible to determine not only the magnitude of the signals received by the various geophones, but also to measure the time required for the seismic waves to travel from the disturbance point down to the various discontinuities and thence to the geophones.

In the past it has been the general practice to amplify the seismic signal generated by a geophone and to record the signal by means of a suitable camera. The camera may take the form of a recording oscillograph or as is more recently the case, it may take the form of a magnetic or photographic recording device capable of recording a signal in reproducible form. It is this amplified record signal which the seismic computers study.

Most conventional seismographs (that is devices for recording the seismic signals) are capable of recording up to 24 or more separate seismic signals simultaneously. Thus, if a seismic observation results in 24 seismic signals being generated in as many detection stations, the resulting seismograph is a 24 trace record of the resulting 24 signals. The traces are usually arranged in a side by side manner; a timing trace indicating predetermined time intervals is simultaneously recorded with the seismic signals to indicate the amount of time along each trace.

In this description it is assumed that the term seismogram is intended to mean a multiple trace recording of a plurality of geophone signals from a seismic observation. The term seismic trace or channel is intended to mean the record formed on a record medium by reception of a train of signals from an individual geophone location. The term seismic section shall be intended to mean a seismogram prepared from one or more seismograms. The individual traces that form the seismic section are arranged in the same lateral order as the geophone locations corresponding to the traces; and the distances between the centers of variable density traces are preferably proportional to the distances between the geophone locations so as to render the final production a reasonably accurate map or vertical cross section of the portion of the earth under study.

Once a seismic section has been made, persons skilled in the art are generally able to determine from the data recorded on the seismogram certain characteristics of the earth's substrata in the vicinity of the seismic observation.

The accuracy of exploration by seismic methods depends to a large extent upon the ability of an observer to analyze the recorded seismic information. It has been found that variable density records, in which the signal is reproduced of the photographic trace which varies in intensity along its length in proportion to the intensity of the signal, are more easily analyzed than other types of records. There are various known means for producing variable density photographic records. The nature and value of variable density presentation are explained in an article published in Geophysics, Volume XXII, Number 2 (April 1957), pages 286–308.

Significant information is much more easily recognized on variable density seismic sections than on oscillographic sections. When working on variable density sections, most interpreters view such sections from a side edge, at a low angle, so that dips, structures, pinchouts, etc. stand out more clearly. In doing this, the interpreters are looking at a section which has, in effect, been compressed in one direction. The need for a system which will achieve this effect, in the form of a permanent record, is therefore apparent. The system disclosed herein fills this need.

Accordingly, it is one object of this invention to provide a system whereby prints may be made from negatives which are compressed in one dimension.

Another object of the invention is the making of variable density depth sections from variable density time sections.

Briefly, one preferred embodiment of this invention concerns a system for reduction or enlargement of a photographic print by placing two screens between the negative of the print to be processed and a photographic sensitive medium. The two screens are parallel to the print being reproduced and to the photographic sensitive medium. A uniform light source is provided.

The screens are opaque with the exception of a narrow slit across the center of each screen. The slit on one screen is parallel to the vertical dimension of the negative and the slit in the second screen is parallel to the horizontal dimension of the negative. In other words, the slits in the two screens are at right angles to each other. The position of the horizontal slit with respect to the negative and the photographic sensitive medium determines the vertical dimension of the image reproduced. By varying the position of the first and second screen between the negative and the photographic sensitive medium, any reduction or enlargement of either the vertical or horizontal dimension of the negative being reproduced can be obtained.

Other objects and a fuller understanding of the invention will be apparent from the following description, when read in connection with the accompanying drawing; wherein.

Figure 1:
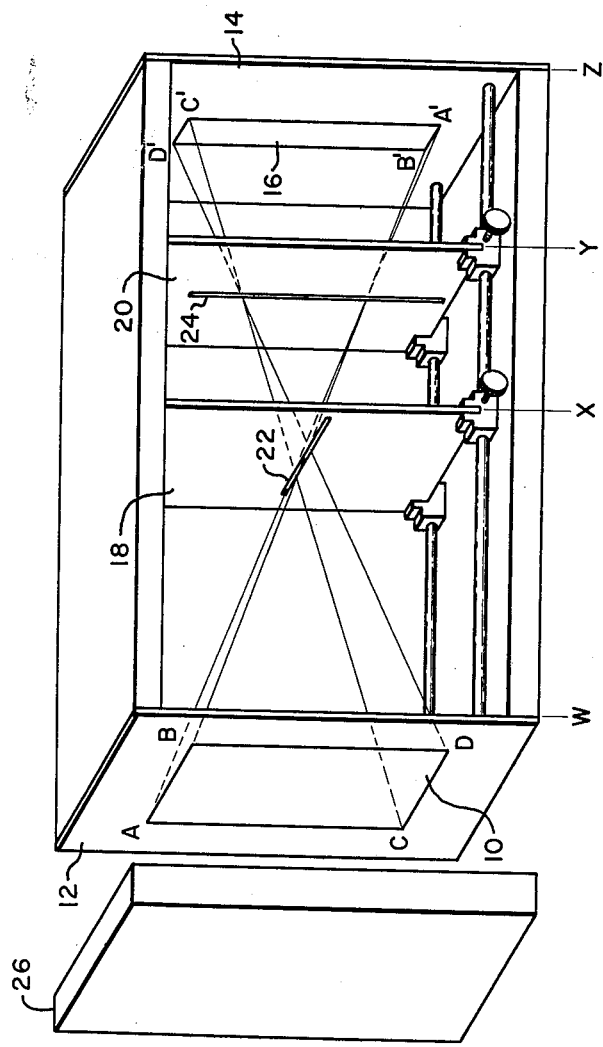
FIG. 1 is a schematic view of the arrangements of the various elements in one embodiment of the invention.

Referring to the drawing, and FIG. 1 in particular, the best mode contemplated for carrying out this invention is illustrated. There is illustrated a negative 10 which is to be processed and which is held in place by negative plate holder 12. Holder 12 is such that light from light source 26 will pass through negative 10 and transmit the image thereof beyond plate holder 12. It is thus clear that plate holder 12 may be made of a transparent material. Light from light source 26 should be uniform and cover an area at least as large as the negative to be processed.

Spaced from holder 12 and parallel thereto is plate 14 which is of a character to support a light sensitive recording medium 16, such as photographic paper, parallel to negative 10. Positioned between holder 12 and plate 14 and parallel thereto are a first screen 18 and a second screen 20. Screens 18 and 20 are opaque except for a narrow slit across the center of each screen. Screen 18 has a horizontal slit 22. The position of slit 22 determines the height of the image being reproduced on film 16. Screen 20 has a vertical slit 24. The position of slit 24 determines the width of the image on film 16. The negative, illustrated as ABDC, being processed will appear as an image on film 16 illustrated as A', B', D', C'. From the figure it is thus seen that $$\frac{AC}{A'C'} \text{ is equal to } \frac{WX}{XZ}$$

and that $$\frac{AB}{A'B'} \text{ equals } \frac{WY}{YZ}$$

It is thus clear that any enlargement or reduction of either the vertical or horizontal dimension or both may be readily obtained with this device by the proper positioning of slits 22 and 24 with respect to negative 10 and the light sensitive recording medium 16.

Slits 22 and 24 as illustrated in FIG. 1 are straight narrow slits. The edge of the opening on the screen which forms the slit should be knife edged. The slit width is determined preferably experimentally. If the slit is too wide the light from any one point will spread over a distance such that for a 1 to 1 print detail is lost. If the slit is too narrow the diffracted rays are of nearly the same intensity as the direct rays and the image is blurred. In other words, the direct rays are so weak that a longer exposure is required. Experiments have shown that the slit width for a printer 18 inches long (that is 18 inches from film 10 to photographic reproducing paper 16 is 18 inches) should be .012 of an inch.

Figure 2C:
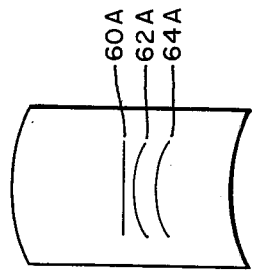
FIG. 2C the distorted reproduction of FIG. 2A using the slit in FIG. 2B.
Figure 2B:
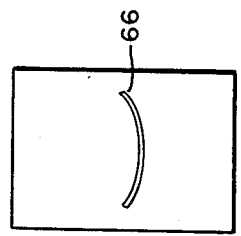
FIG. 2B a curved slit.
Figure 2A:
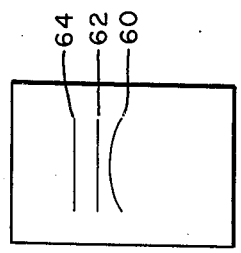
FIG. 2A illustrates a section having a curved event which is desired to be straightened.

Although slits 22 and 24 shown in FIG. 1 are illustrated as being straight slits, it is to be understood that these slits may be curved or bent for making distorted reproduction; that is distorted from the print being processed. The curve of course is made to give the desired distortion. For example, the print in FIG. 2A represents a seismic section having a curved event 60 which is desired to be flattened out, that is made into a straight line. FIG. 2A also has other events 62 and 64 which are representative of horizontal or flat events. FIG. 2B illustrates a curve slit 66 whose shape is inverted to that of event 60 in FIG. 2A. When the print in 2A is processed using the slit 66 of FIG. 2B in place of horizontal slit 22, the distorted reproduction illustrated in FIG. 2C is obtained. It is seen that event 60 which is represented by 60A has been straightened out and events 62 and 64 have been reproduced as illustrated. The use of curved slot as illustrated in FIGS. 2A, 2B, and 2C is helpful in "isopaching" in seismic interpreting work, that is when a particular bed or reflection of interest is desired to be used as a reference plane.

Figure 3C:
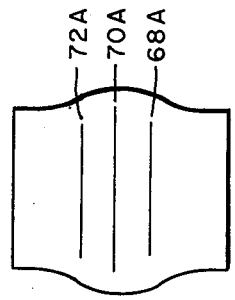
FIG. 3C the distorted reproduction of FIG. 3A using the slit in FIG. 3B; and, FIG. 4 represents in schematic form another embodiment of an apparatus for making distorted reproductions.
Figure 3B:
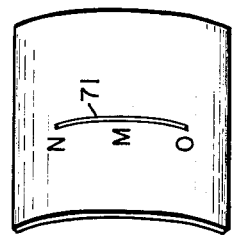
FIG. 3B a bent slit.
Figure 3A:
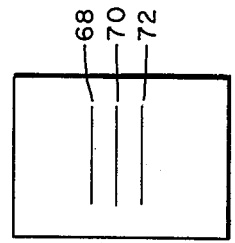
FIG. 3A illustrates a section of uniform width.

A bent slit is illustrated in FIG. 3B and is used for example if it is desired to distort a reproduction illustrated in FIG. 3A in which horizontal event 70 is to be reduced less (or increased more as desired) in width than events 68 and 72. As illustrated in FIG. 3C event 70A is of greater width than events 68A and 72A. The center part M of the bent curve 71 in FIG. 2B is closer to the negative being processed than the ends portion N and O, thus less reduction of the center portion of the negative.

Various shapes and type slits may be desirable for distorting a seismic section in a manner such as will produce a presentation which is more representative of a factual subsurface formation.

The slits in FIGS. 1, 2, and 3 were all illustrated as being in fixed positions during the reproduction of a negative or print. However, for certain problems using slits which can be moved during the course of exposure is very helpful. One embodiment along this line entails the use of a slit at the light source which is moved in synchronization with the movement of one or both of the slits in the opaque screens. Such a system may be used for making distorted reproductions. A special application of this process is for making variable density depth sections from variable density time sections. This can readily be accomplished with the device illustrated in FIG. 4.

A rolling screen 30 with horizontal slit 32 is mounted on rollers 34 and 36. The screen is placed adjacent the negative to be reproduced and between that negative and the light source. A uniform speed motor 38 is used to drive roller 36 by drive belt 40 mounted on pulley 39 which is rotated by the shaft of motor 38. Screen 42 having horizontal slit 44 which is similar to screen 18 and slit 22, is slidably mounted on rods 46 and 48. Screen 42 is biased in the direction of the negative by resilient means such as spring 50. Shaft 41 has mounted thereon roller 36, pulley 45 and gear reduction box 43. Shaft 54 extends from gear reduction box 43 and has mounted thereon cam 56. Screen 42 has cam follower 58 which is forced against the periphery of cam 56 by biasing means 50. The position of screen 42, and slit 44, is controlled by the rotational position of cam 56. By proper design of the relative size of roller 36, pulley 45, gear reduction box 43 and the size and shape of cam 56, slit 44 can be moved as desired as slit 32 is moved the vertical distance necessary to expose the negative being processed.

Figure 4:
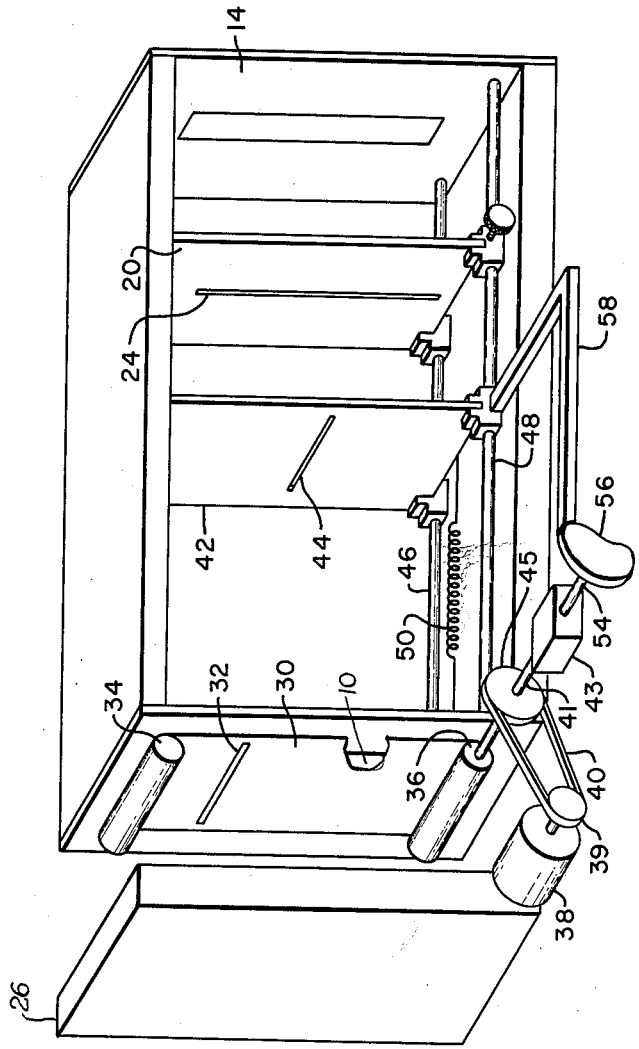

As is well known, the vertical dimension of most seismic sections is in terms of time, that is seconds for example. The time is representative of the depth but the actual depth may be determined only as the velocity or average velocity to a certain plane is considered. The vertical dimension of a seismic section then usually appears as a time dimension rather than a depth dimension. The particular embodiment shown in FIG. 4 is useful for printing variable density time sections into variable density depth sections. To accomplish this, cam 56 is contoured to provide movement of slit 44 proportional to the average velocity of the vertical dimension of the seismic section being processed. For example, time (seconds) multiplied by velocity (feet per second) leaves depth (feet) as the vertical dimension of the processed section. The apparatus is designed such that the screen 42 with slot 44 is moved from one position representing the top of a seismic section being processed to a second position representing the bottom of the seimic section during the exposure time of the seismic section, i.e. the time that slit 32 is moved from the top to the bottom of the seismic section being processed. In other words, the light source slit 32 moves uniformly with time and the horizontal slit 44 moves at some function of time determined by velocity at various depths of the section.

In order to obtain a long variable density section, it must be made up of several narrow variable density sections. A variable density section may cover several miles in length which may be up to 50 miles or more. This long variable density section then is made up of several narrow reductions which have been reduced according to the process of this invention. It is quite difficult to maintain an exact uniform density on all the individaul sections that are to be put side by side in the final print. Density variations on the final print are very noticeable and distract greatly from the section. Even when the light meter is used to get proper exposure, factors such as the voltage variations, varying developer, strength and so forth cause variations in density. To eliminate these variations on the final print, a masking technique is used to make a mask for use with the negative when making the final print.

A mask is conveniently made in the differential reduction printer shown in FIG. 1 with the exception that plate 20 which has the vertical slit 24 is removed and horizontal slit 22 is reduced in length so that it is about ⅜ inch long. The reduced length is determined by experiment and is just long enough to obscure all detail on individual traces. Screen 18 is placed so that $WX=YZ$. The reduced negatives which have been taped together to form a reduced "long section" are then put in the printer, that is in holder 12 with the traces of the section parallel to the slit. The photosensitive medium exposed then on plate 14 is a mask which has sharp definitions between adjacent sections or traces of which is exposed according to the average density of individual traces as measured over a distance of twice the slit length. The mask does not show cycles of the seismic trace, but does show density variations between traces or between sections. Since this mask is the negative of the density variation, it can now be used as an overlay to cancel out variations on the original negative. This same masking technique can be used to make uniform prints of any variable density section which has density variations in the negative.

While there are disclosed but a limited number of the structure, process and product of the invention herein presented, it is possible to produce still other embodiments without departing from the inventive concept herein disclosed, and it is desired therefore that only such limitations be imposed on the appended claims as are stated therein, or required by the prior art.

What is claimed is:

1. A method for processing a seismic section using a differential printer having a first opaque screen and a second opaque screen between a photographic sensitive medium and a negative in which slits are located in the parallel plane surfaces of the opaque screens and with the slits being at right angles to each other which comprises: exposing a narrow horizontal section of said negative of said seismic section with the horizontal section exposed from the top to the bottom of said negative; and moving the first said screen toward said second opaque screen at a rate of speed to compensate for vertical variation in velocity of the vertical segment of the earth represented by said seismic section.

2. A method for making a mask from a seismic section negative having vertical parallel traces thereon using a printer having an opaque screen in which a horizontal slit of the proper length to obscure all detail on individual traces is located in the plane surfaces of the opaque screen which comprises: blocking off the length of the slit in said opaque screen to a length to obscure all minute detail but retain average light intensity variations of images of individual traces of the seismic section falling on a photosensitive medium; exposing a photosensitive medium by directing light toward said seismic section negative and through said slit; and developing the exposed photosensitive medium to obtain a mask having sharp definitions between adjacent traces whose individual detail is blurred.

3. A method for processing a seismic section using a differential printer having a first opaque screen and a second opaque screen between the photographic sensitive medium and a seismic section negative having vertical parallel traces in which slits are located in the parallel plane surfaces of the opaque screen, the slit in the first opaque screen being horizontal and the slit in the second opaque screen being vertical which comprises: removing the second opaque screen having the vertical slit; blocking off the length of the slit in said first opaque screen to a length sufficient to obscure all minute detail but retain average light intensity variations of images of individual traces of the seismic section falling on the photosensitive medium; exposing the photosensitive medium; developing the exposed photosensitive medium to obtain a mask; placing the second opaque screen within the differential printer; placing the mask adjacent the seismic section negative and thereafter exposing another photosensitive medium.

4. An apparatus for making variable density seismic depth sections from variable density seismic time sections which comprises: means for holding a negative of the time section in a fixed position; means for holding a photographic sensitive medium parallel to and spaced from said negative; a first opaque screen parallel to said negative and spaced between said negative and said photographic sensitive medium, said first opaque screen being characterized by having a narrow horizontal slit across the center thereof; a second opaque screen spaced between said first opaque screen and said photographic sensitive medium, said second opaque screen having a narrow vertical slit across the center thereof; a light source of uniform intensity over an area at least as large as said negative and spaced from said negative on the opposite side thereof from said screens; a third opaque screen between said light source and said first opaque screen, said third opaque screen having a horizontal slit for the passage of light; means for moving said third opaque screen at a constant speed in a vertical direction so as to direct light onto a narrow horizontal section of said negative with the horizontal section on which light is directed progressing from the top to the bottom of said negative; means for moving first said screen in one direction with respect to said negative during the exposure of said negative in which the first said screen is moved as a function of time determined by the velocity of the depth of the section being exposed.

5. An apparatus as defined in claim 4, in which the slit in said first screen is curved.

6. A differential reduction printer for processing a seismic section for making a distorted photographic print of a negative which comprises: means for holding said negative in a fixed position; means for holding a photographic sensitive medium parallel to and spaced from said negative and aligned therewith; a first opaque screen parallel to said negative and spaced between said negative and said photographic sensitive medium, said first opaque screen being characterized by having a narrow horizontal slit across the center thereof; a second opaque screen spaced between said first opaque screen and said photographic sensitive medium, said second opaque screen having a narrow slit at right angles to the slit in said first opaque screen; means for exposing said photographic sensitive medium by directing a narrow, constant speed scanning beam through said negative; means for moving one of said screens during the exposure of said negative, the instantaneous position of said plate being a function of the distortion desired for the segment of the negative then exposed.

7. A differential reduction printer for processing seismic sections for making a photographic print from a negative in which one dimension of the print is enlarged or reduced in comparison to the other dimension of the print which comprises: means for holding said negative in a fixed position; means for holding a photographic sensitive medium parallel to and spaced from said negative; a first opaque screen parallel to said negative and spaced between said negative and said photographic sensitive medium: said first opaque screen being characterized by having a narrow horizontal slit across the center thereof; a second opaque screen spaced between said first opaque screen and said photographic sensitive medium, said second opaque screen having a narrow slit across the center thereof and at right angles to the slit in said first opaque screen; a light source of uniform intensity and of greater area than said negative, said light source being on the opposite side of said negative from said screens; and a mask between said light source and said negative, said mask being a negative of the density variation of said negative, such mask being in sharp focus in one dimension and blurred in the other dimension.

8. An apparatus as defined in claim 7 in which one of said slits is curved.

9. An apparatus as defined in claim 7 in which one of said slits is bent.

References Cited in the file of this patent

UNITED STATES PATENTS

| | | |
|---|---|---|
| 1,528,021 | Janzer | Mar. 3, 1925 |
| 1,641,184 | McNeely | Sept. 6, 1927 |
| 1,652,271 | Cooke | Dec. 13, 1927 |
| 1,853,072 | Morioka | Apr. 12, 1932 |
| 2,077,490 | Paris | Apr. 20, 1937 |
| 2,282,337 | Mies et al. | May 12, 1942 |
| 2,286,628 | Kidder | June 16, 1942 |
| 2,535,348 | Caan | Dec. 26, 1950 |
| 2,558,605 | Coutant et al. | June 26, 1951 |
| 2,701,196 | Conrad | Feb. 1, 1955 |
| 2,746,833 | Jackson | May 22, 1956 |
| 2,861,507 | Palmer | Nov. 25, 1958 |

FOREIGN PATENTS

| | | |
|---|---|---|
| 951,128 | Germany | Oct. 25, 1956 |